United States Patent [19]

Rennick

[11] 4,153,670
[45] May 8, 1979

[54] METHOD OF TREATING AN ALKALI METAL SULFIDE LIQUOR

[75] Inventor: Robert D. Rennick, Thousand Oaks, Calif.

[73] Assignee: Rockwell International Corporation, El Segundo, Calif.

[21] Appl. No.: 883,616

[22] Filed: Mar. 6, 1978

Related U.S. Application Data

[63] Continuation-in-part of Ser. No. 723,389, Sep. 15, 1976, abandoned.

[51] Int. Cl.$^2$ .................. C01D 7/00; C10B 17/16; D12C 11/02
[52] U.S. Cl. .................. 423/189; 423/422; 423/428; 423/437; 423/563; 423/DIG. 3; 162/36
[58] Field of Search .................. 423/234, 561 R, 563, 423/210, 220, 562, 421, DIG. 3, 428, 207, 561 A, 422, 189, 209; 210/42, 49; 162/36

[56] References Cited

U.S. PATENT DOCUMENTS

| | | | |
|---|---|---|---|
| 2,094,070 | 9/1937 | Hartman et al. | 423/563 |
| 2,656,245 | 10/1953 | Gray et al. | 423/DIG. 3 |
| 2,788,273 | 4/1957 | Shick | 162/36 |
| 2,864,669 | 12/1958 | Ahlborg et al. | 423/202 |
| 3,293,113 | 12/1966 | Vewemark | 423/224 |
| 3,331,732 | 7/1967 | Vewemark | 423/573 G |
| 3,471,249 | 10/1969 | Markawt et al. | 423/220 |
| 3,826,710 | 7/1974 | Anderson | 423/DIG. 3 |
| 3,841,961 | 10/1974 | Shiha | 423/220 |
| 4,083,930 | 4/1978 | Kohl | 423/563 |

Primary Examiner—O. R. Vertiz
Assistant Examiner—Gary P. Straub
Attorney, Agent, or Firm—L. Lee Humphries; Henry Kolin; Clark E. DeLarvin

[57] ABSTRACT

A method of treating an aqueous alkali metal sulfide-containing liquor to remove the sulfur values therefrom. Broadly, the method comprises introducing an alkaline liquor containing an alkali metal sulfide into a neutralization zone where it is intimately contacted and reacted with a sufficient amount of a gas containing a major amount of $H_2S$ and a minor amount of $CO_2$ to produce a product liquor of reduced alkalinity consisting essentially of a slurry of alkali metal bicarbonate and alkali metal bisulfide. The product liquor is withdrawn from the neutralization zone and introduced into a carbonation zone where it is contacted with a sufficient amount of a $CO_2$-containing gas to produce a product stream comprising a slurry of alkali metal bicarbonate crystals substantially free of alkali metal bisulfide and an $H_2S$-rich product gas containing a minor amount of $CO_2$. The $H_2S$-rich product gas so produced is recovered, and about 40% to 60% of it is introduced into the neutralization zone. The product stream of alkali metal bicarbonate is thermally decomposed to produce a $CO_2$-rich offgas and a solution consisting essentially of alkali metal carbonate. The $CO_2$-rich offgas from the thermal decomposition is recovered for introduction into the carbonation zone along with additional $CO_2$ obtained from a waste gas usually containing less than about 35% $CO_2$ by volume.

6 Claims, 1 Drawing Figure

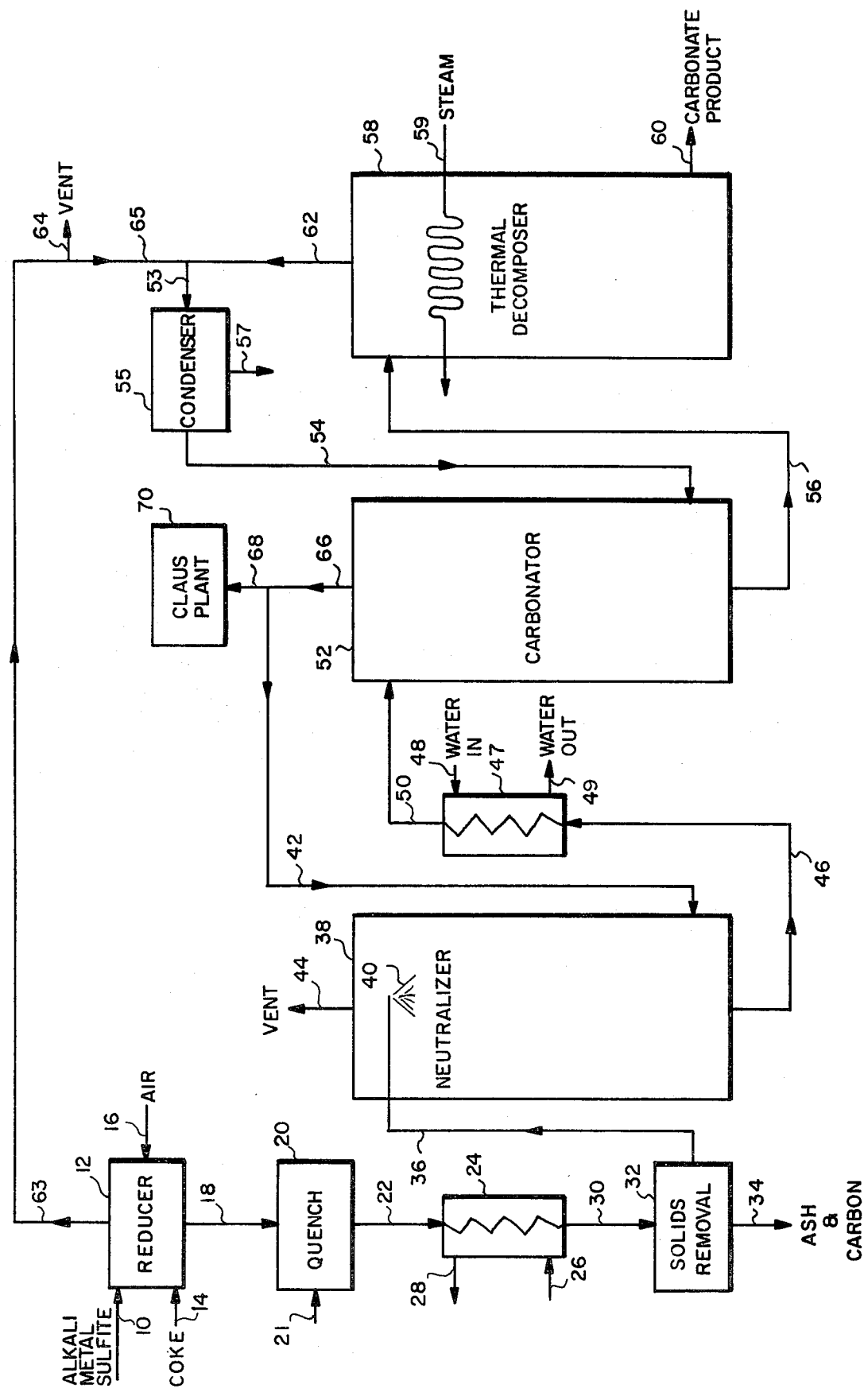

METHOD OF TREATING AN ALKALI METAL SULFIDE LIQUOR

CROSS REFERENCE TO RELATED APPLICATION

This application is a continuation-in-part of application Ser. No. 723,389 filed Sept. 15, 1976, now abandoned.

BACKGROUND OF THE INVENTION

1. Field of the Invention

This invention pertains to the removal of sulfur values in the treatment of an alkali metal sulfide liquor. It particularly relates to a method wherein the alkali metal sulfide is converted to the corresponding alkali metal carbonate and the sulfur is recoverable as a salable product. In a particularly preferred aspect, the invention relates to the treatment of a liquor containing a solute which comprises a mixture of at least about 60 mole % alkali metal sulfide and the balance is principally alkali metal carbonate.

2. Prior Art

There are several sources of mixed alkali metal salts such as, for example, mixtures of alkali metal sulfides and carbonates, which advantageously are treated to recover the sulfur content and produce a substantially pure alkali metal carbonate. One such source is the pulp and paper industry, wherein a cellulose is manufactured by digestion of wood with alkali metal sulfides or sulfite. In such a process, a bleed stream digestion liquor is drawn off, concentrated, and burned producing a molten salt mixture which generally consists substantially of sodium carbonate and sodium sulfide. Various methods have been suggested for treating such molten salts.

More recently, it has been suggested that carbonaceous materials such as coal, coal tar, oil shale, petroleum coke, and petroleum residuums, be decomposed in a molten alkali metal carbonate bath to recover the resultant valuable gaseous products. The feed materials generally contain sulfur compounds, which react with and are retained in the molten bath. In addition, such materials, particularly in the case of coal, also contain significant amounts of inorganic ash constituents, which also are retained in the molten bath. Therefore, it is necessary to periodically (or continuously) remove a portion of the molten alkali metal carbonate bath and treat it to remove the retained ash constituents and sulfur, and permit the return of alkali metal carbonate to the bath for further use.

Another source of mixed alkali metal sulfide-carbonate salts is from a gas scrubbing process, wherein a waste gas containing sulfur oxides is reacted with alkali metal carbonates and/or bicarbonate absorbent (either dry or in an aqueous solution) to produce an alkali metal sulfite and sulfate product which generally also contains some unreacted absorbent. The alkali metal sulfite and sulfate product can be reacted with a reducing agent such as carbon or coal to form alkali metal sulfides which then can be introduced into an aqueous medium to form an aqueous solution of alkali metal sulfides, which may also contain alkali metal carbonate, bicarbonate, and any ash constituents removed from the waste gas stream or contained in the reducing agent utilized.

In U.S. Pat. No. 2,094,070, Hultman et al., there is disclosed a process for recovering $H_2S$ from gases. Broadly, the process comprises contacting an $H_2S$-containing gas stream with a solution of alkali metal carbonate, which absorbs the hydrogen sulfide. The solution then is treated with a sufficient amount of carbon dioxide to convert the carbonate into bicarbonate without removal of the hydrogen sulfide. The treated solution is boiled under a vacuum to expel the hydrogen sulfide and steam. The boiling is then continued at a higher temperature and pressure to convert the bicarbonate back to the carbonate for recycle to absorb more $H_2S$.

U.S. Pat. No. 2,496,550, Larsson et al., discloses a process for the recovery of alkali metal salts from the waste liquors from the production of cellulose by the digestion of the wood with an alkali metal salt such as alkali metal sulfites and bisulfites. The process comprises evaporating and burning the waste liquor to form a molten mass containing alkali and sulfur compounds followed by dissolving the molten mass in a solvent. Thereafter, carbon dioxide is introduced into the solution to form alkali metal bicarbonate in an amount sufficient to approach the limit of solubility of the bicarbonate in the solution. The solution is then heated to eliminate the hydrogen sulfide formed therein. After removal of the hydrogen sulfide, the solution is treated with additional carbon dioxide to crystallize alkali bicarbonate, which is recovered from the solution. Larsson et al further suggests that the solution, after removal of the alkali metal bicarbonate, be used as the solvent for dissolving the molten mass formed from burning the waste liquor.

U.S. Pat. No. 2,675,297, Gray et al., relates to the treatment of aqueous solutions of sodium sulfide for conversion of the sulfides to salts of carbonic acid and the liberation of hydrogen sulfide. Patentees suggest subjecting a solution containing sodium sulfide to a plurality of carbonaceous treatments with gaseous carbon dioxide at an elevated temperature and pressure, each carbonation treatment being followed by steam stripping under a vacuum to remove volatile hydrogen sulfide in a concentrated form, thereby producing a solution having an enhanced content of sodium salts of carbonic acid substantially free from sulfide.

In U.S. Pat. No. 3,567,377, Lefrancois et al., there is disclosed a process for the recovery of sulfur values from sulfur-bearing materials. In accordance with the process disclosed therein, a sulfur-containing carbonaceous material is contacted in the presence of a reducing gas with a molten medium comprising an alkali metal carbonate to convert the sulfur to an alkali metal sulfide. The molten medium containing the absorbed alkali metal sulfide is mixed with an aqueous solution of the acid salt of the alkali metal carbonate. The resulting solution is filtered to remove any solids contained therein and then reacted with carbon dioxide to form hydrogen sulfide as a gaseous product of the reaction.

U.S. Pat. No. 3,508,863, Kiminki et al., discloses a process for the preparation of sodium carbonate monohydrate from a soda smelt solution. The process is directed toward the treatment of a smelt solution arrived at by burning spent pulping liquor. The smelt solution is precarbonated with gases containing carbon dioxide to form dissolved sodium bicarbonate followed by evaporation of the precarbonated solution together with added sodium bicarbonate to remove all the sulfides as hydrogen sulfide together with water vapor and to form crystalline sodium carbonate monohydrate for recovery.

Other patents relating to the treatment of alkali metal sulfides are U.S. Pat. No. 1,945,163 (Rosenstein et al.); U.S. Pat. No. 2,730,445 (Sivola); U.S. Pat. No. 3,438,728 (Grantham); U.S. Pat. No. 3,574,543 (Heredy); and U.S. Pat. No. 3,867,514 (Moore).

While each of the foregoing processes offer certain advantages, none has proven entirely satisfactory. Some are disadvantageous in that a multitude of steps are required. In others, no provision is made for obtaining the necessary carbon dioxide from the process itself, thus raising the operating cost, while others create difficulties owing to corrosion and very high amounts of gases to be handled. Several of the processes require use of excessive amounts of steam, and others require use of heat exchangers which are subject to plugging and scaling due to the deposition of solid materials from solution. In others, noxious sulfur-containing gases are evolved to the atmosphere. A principal problem with most of the prior art processes for treating sulfide liquors to remove the sulfur values therefrom is that they either (a) produce a dilute (less than 30 vol.%) $H_2S$ gas stream, or (b) when they produce an $H_2S$-rich gas stream, i.e., one containing in excess of 30% $H_2S$ on a dry basis, the processes require the use of substantially pure $CO_2$. When the $H_2S$ gas stream is dilute, it necessarily requires more expensive processing to recover the sulfur values. For example, in the operation of a Claus plant, when the feed stream of $H_2S$ is less than about 30%, an auxiliary source of fuel is required, thus obviously increasing the cost of the process. Also, a dilute Claus feed gas requires a greater number of stages to obtain a high percent of sulfur recovery. When the $H_2S$ gas stream contains more than 30% by volume on a dry basis of $H_2S$, then an auxiliary source of fuel is not necessary, and the size of the plant can be reduced. Obviously, this is desirable both from the standpoint of economics and in the interest of conserving fuel. There is, therefore, a need for a method of treating sulfide liquors to produce an $H_2S$ offgas containing greater than 30% by volume $H_2S$, and which method does not require the use of pure $CO_2$. Obviously, therefore, there is still a need for an improved economical process for the treatment of mixtures of alkali metal sulfides and carbonates for the removal of sulfur values therefrom.

SUMMARY OF THE INVENTION

In accordance with the present invention, there is provided an efficient economically viable non-polluting method of treating an alkali metal sulfide liquor to convert the alkali metal sulfide to carbonate and remove and preferably recover the sulfur constituents as a salable product. It is an advantage of the present invention that it is possible to produce a sulfur-containing gas stream in which the sulfur constituent is present in the form of $H_2S$ in an amount greater than 30% by volume on a dry basis without the use of substantially pure carbon dioxide.

Broadly, the method comprises introducing an alkaline liquor containing a solute which comprises in excess of about 60 mole % of an alkali metal sulfide into a neutralization zone, where it is intimately contacted and reacted with a sufficient amount of an $H_2S$- and $CO_2$-containing gas to produce a product liquor of reduced alkalinity which principally comprises a slurry of crystals of alkali metal bicarbonate and bisulfide. The $H_2S$- and $CO_2$-containing gas is introduced into the neutralization zone in an amount sufficient to reduce the pH of the liquor to from about 7.5 to 9.5. The product liquor withdrawn from the neutralization zone principally comprises a slurry of sodium bisulfide and sodium bicarbonate and may contain a minor amount of sodium carbonate as well as dissolved $H_2S$ and $CO_2$.

The product liquor withdrawn is introduced into a carbonation zone where it is contacted with a sufficient amount of a $CO_2$-containing gas to produce a liquid stream comprising a slurry of alkali metal bicarbonate substantially free of alkali metal bisulfide. There also is produced in the carbonation zone an $H_2S$-rich product gas (in excess of about 30% by volume on a dry basis) which will contain a minor amount of unreacted $CO_2$ (usually about 8 to 20 volume %). The $H_2S$-rich product gas so recovered is split into two streams, one of which comprises about 40-60 volume % of the total product and it is introduced into the neutralization zone for contact and reaction with additional sulfide-containing liquor. The balance of the $H_2S$-rich product gas is processed for recovery of the sulfur values therefrom, such as in a conventional Claus plant.

The product slurry from the carbonation zone is thermally decomposed to produce a concentrated solution of alkali metal carbonate and a $CO_2$-rich offgas. At least a part of the $CO_2$ offgas is recovered for use in the carbonation zone. In accordance with the present invention, a dilute source of makeup $CO_2$ can be used and still produce an $H_2S$-rich gas stream. Thus, additional $CO_2$ from a gas stream containing from about 15 to 35 volume % $CO_2$ also is introduced into the carbonation zone.

The method is applicable to either mixed alkali metal salts, such as a mixture of sodium and potassium carbonates and sulfides, or a single alkali metal. The particularly preferred alkali metal is sodium, because of the lower solubility of the sodium bicarbonate in solution. Potassium bicarbonate has a higher solubility and therefore is less preferred. Rubidium and cesium are not preferred in view of their high cost. The present method is not readily amenable to the treatment of a lithium sulfide and carbonate mixture, since the carbonates of lithium are relatively insoluble.

BRIEF DESCRIPTION OF THE DRAWING

The sole FIGURE is a schematic flow diagram of a method for treating an alkali metal sulfide liquor in accordance with the present invention.

DETAILED DESCRIPTION OF THE INVENTION

For convenience, the following description is directed to a particularly preferred embodiment wherein a waste gas containing sulfur oxides is scrubbed with an alkali metal carbonate and/or bicarbonate solution to absorb the sulfur dioxide and produce alkali metal sulfites and sulfates, which subsequently are reduced to alkali metal sulfides and quenched to form an aqueous alkali metal sulfide liquor. Examples of such processes are disclosed in U.S. Pat. No. 3,932,587, Absorption of Sulfur Oxides from Flue Gas, and pending patent application Ser. No. 634,726 filed Nov. 24, 1975, both of which are assigned to assignee of the present invention.

Alkali metal sulfite (or sulfate) is introduced via a conduit 10 into a reducer 12. The alkali metal sulfite may be either a pure alkali metal sulfite or may contain up to about 40 mole % of other salts such as alkali metal carbonates and bicarbonates. The alkali metal sulfite may be introduced into reducer 12 as a dry powder or as an aqueous solution or slurry. Preferably, the alkali metal sulfite is introduced as a substantially dry powder (less than about 5 wt.% water). Also introduced into reducer 12 via a conduit 14 is a reducing agent such as coke. Other suitable reducing agents could be used, including carbonaceous materials such as coal, carbon, charcoal, or even carbon monoxide. Alternatively, hydrogen could be used as the reducing agent. However, the high cost of hydrogen usually precludes its use. Air also is introduced into reducer 12 via a conduit 16. The air and a portion of the reducing agent are reacted to maintain the desired temperature within reducer 12. Generally, the temperature in reducer 12 is maintained within a range of from about 900° to 1100° C.

A stream of the reduced salt is withdrawn from reducer 12 via a conduit 18 and the solute comprises at least 60 mole % alkali metal sulfide and may contain up to about 40 mole % sodium carbonate and from 1 to about 25 wt. % of any ash constituents contained in the reducing agent. For example, when the reducing agent is a coal, the ash constituents generally are present principally as silicon and aluminum oxide salts of the alkali metal. The ash also may include small amounts of metals such as iron, vanadium, and the like. The metals generally are present in the form of either sodium oxide compounds or sulfides.

The reduced salt is quenched in a quench vessel 20, with water introduced via a conduit 21 to provide an aqueous solution of alkali metal sulfide having a pH of from about 12 to 14. The pressure and temperature maintained within the quench vessel are not particularly critical, provided, however, that the mixture of melt and water is substantially all maintained in a liquid phase excluding, of course the ash constituents.

The aqueous solution of alkali metal sulfide is withdrawn from quench vessel 20 via a conduit 22 and introduced into a heat exchanger 24. Preferably, heat exchanger 24 is of the indirect type to minimize unnecessary dilution of the alkali metal sulfide solution. Heat exchanger 24 is provided with a source of cooling water introduced via a conduit 26 and removed via a conduit 28. The alkali metal sulfide solution is cooled to a temperature of less than about 40° C. and generally to a temperature of from about 30° to 35° C. The cooled alkali metal sulfide solution leaves heat exchanger 24 via a conduit 30 and is introduced into a solids removal zone 32. Solids removal zone 32 may be any conventional apparatus known to those versed in the art such as a centrifuge, or settler vessel, or the like. The solids are removed from solids removal zone 32 via a conduit 34 and principally comprise unreacted reducing agent and the ash constituents from the reducing agent, as well as any ash or metallic constituents of the original alkali metal sulfite feed.

A clarified liquor, substantially solids-free, is withdrawn via a conduit 36 for introduction into a neutralizer 38. Preferably, the clarified liquor is sprayed into neutralizer 38, such as, for example, through spray nozzles 40. Also introduced into neutralizer 38 via a conduit 42 is an H2S-rich gas. The H2S-rich gas stream generally comprises at least 30 volume %, and preferably in excess of 33 volume % H2S on a dry basis; the balance principally comprising nitrogen and from about 8 to 20 volume % CO2. The H2S-rich gas is introduced in an amount sufficient to provide a product liquor of reduced alkalinity, which is withdrawn via conduit 46. There is provided a sufficient amount of the H2S-containing gas to provide a product liquor having a pH within the range of from about 7.5 to 9.5, and preferably from about 7.5 to 8.5.

The principal reactions taking place in neutralizer 38 are represented by the following exemplary formula.

$$Na_2S + H_2S \rightarrow 2NaHS$$

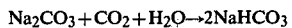

$$Na_2CO_3 + CO_2 + H_2O \rightarrow 2NaHCO_3$$

The foregoing reactions are the principal reactions which will occur within the pH range of from 7.5 to 9.5 and a reaction temperature of from about 30° to 60° C. such that there is produced a product liquor principally comprising a slurry of sodium bicarbonate and sodium bisulfide. These reactions are exothermic so that the reaction temperature may increase by as much as 10° to 30° C. or more unless provisions are made for maintaining the temperature within the specified range. Preferably the temperature in the reaction zone is maintained within the range of from about 30° to 55° C.

The reaction products in the slurry of reduced alkalinity will comprise about 40 to 80 mole % alkali metal bisulfide, and from about 20 to 45 mole % alkali metal bicarbonate, and less than about 10 mole % unreacted alkali metal carbonate. It also may contain minor amounts of dissolved H2S and CO2. Under the foregoing conditions, substantially all of the H2S and CO2 are reacted in neutralizer 38 such that there is produced a product gas containing less than 2 volume % CO2 and substantially free of any sulfur constituents (less than 100 ppm), which is vented through a conduit 44. The product slurry of reduced alkalinity is withdrawn via a conduit 46, is introduced into a heat exchanger 47, which preferably also is of the indirect heat exchange type. The product stream passes through heat exchanger 47 in indirect heat exchange contact, with cooling water introduced via a conduit 48 and withdrawn via a conduit 49. Preferably, the water is supplied in an amount sufficient to provide an exit stream temperature of within a range of from about 30° to 45° C., which is passed via a conduit 50 into a carbonator 52.

In carbonator vessel 52, the product liquor of reduced alkalinity from neutralizer 38 is contacted with a CO2-containing gas stream introduced via conduit 54. The gas stream introduced via conduit 54 will contain from about 25 volume % to about 50 volume % CO2 on a dry basis, the balance principally comprising nitrogen. The CO2-containing gas stream introduced via conduit 54 preferably is introduced in an amount slightly in excess of that required to convert the alkali metal bisulfide to alkali metal bicarbonate. The principal reaction taking place in carbonator 52 may be exemplified by the following formula:

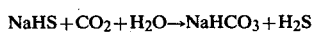

$$NaHS + CO_2 + H_2O \rightarrow NaHCO_3 + H_2S$$

A stream of the product which comprises a slurry consisting principally of bicarbonate crystals is withdrawn from carbonator 52 via conduit 56 and is introduced into a thermal decomposer 58.

In thermal decomposer 58, the bicarbonate slurry is heated to temperature sufficient to decompose the bicarbonate and form a solution of the desired carbonate product which is withdrawn via a conduit 60. The bicarbonate is maintained at an elevated temperature for a time sufficient to produce a product solution, the solute comprising a major amount of alkali metal carbonate (at least 51 mole % and preferably from about 70 to 90 mole %) and the balance principally comprising alkali metal bicarbonate. The solute also may contain up to a total of about 20 mole % of other salts such as alkali metal chlorides and sulfates.

The bicarbonate will start to decompose at a temperature as low as about 60° C.; however, at such temperature the reaction rate is far too slow to be practical. Usually a temperature of from about 90° to 250° C. is utilized with a temperature of from about 100° to 150° C. being preferred. The thermal decomposition may be accomplished through indirect heating, for example, by passing steam through a heat exchange coil 59 or the direct introduction of steam into the thermal decomposer. The decomposition of the bicarbonate also produces a gaseous effluent stream, which will comprise a mixture of water vapor and substantially pure $CO_2$, which is withdrawn via a conduit 62 and introduced via conduit 54 into carbonator 52. Advantageously, the gas flowing through conduit 54 is cooled to a temperature of from about 30° to 45° C. to remove excess water vapor and, more importantly, to assist in maintaining a desired temperature range of from about 40° to 60° C. in carbonator 52.

Additional $CO_2$ also is required for the process. It is a particular advantage of the present invention that a substantially pure $CO_2$ gas stream is not required. Thus, the makeup $CO_2$ required is obtained, for example, from reducer 12. A product offgas is withdrawn from reducer 12 via a conduit 63. This offgas may contain from as low as about 15 up to about 35 volume % $CO_2$; generally, it will contain from 25 to 35 volume % $CO_2$. The excess offgas is vented through a conduit 64 and the desired amount of offgas withdrawn via conduit 65 is combined with the substantially pure $CO_2$ (on a dry basis) gas stream withdrawn via conduit 62 for introduction into carbonator 52. The gas withdrawn via conduit 63 generally is at a very high temperature (from about 900° to 1100° C.) and should be cooled prior to introduction into the carbonator 52. This may be accomplished using any conventional gas cooling apparatus.

Advantageously, for example, the air supplied to reducer 12 via conduit 16 could be passed in heat exchange relationship with the product gas withdrawn via conduit 63, thus also reducing the amount of excess carbonaceous reducing agent required to maintain the desired temperature in reducer 12. In addition, the gas streams from conduits 62 and 65 are combined into a conduit 53 and passed through a condenser 55 to further cool the gases and condense the excess water which is removed via a conduit 57.

In carbonator 52, there also is produced a gaseous product comprising at least 30% and preferably in excess of 33% $H_2S$ by volume on a dry basis. The product gas also may contain from 5 to 15% $CO_2$ and the balance consisting essentially of nitrogen. This product gas is withdrawn from carbonator 52 via a conduit 66. A portion of the gas stream (from about 35 to 65 vol.% and usually about 50 vol.%) is passed through conduit 42 for introduction into neutralizer 38. The balance is conveyed via conduit 68 for introduction into a sulfur removal process such as a Claus plant 70.

The method of the present invention will be more readily understood by reference to the following example, but it is to be understood that this example is in no way to be construed as limiting the scope of the present invention; rather, it is presented principally to show in detail certain embodiments and advantages of the invention.

EXAMPLE

The following example is set forth to illustrate the particularly preferred embodiment of the present invention depicted in the drawing, as applied to a typical salt mixture obtained from the scrubbing of a waste $SO_2$-containing gas with an alkali metal carbonate absorbent. The salt mixture is introduced into the reducer in an amount of 5.7 kg-moles/hr $Na_2SO_3$, 1.9 kg-moles/hr $Na_2SO_4$, 2.4 kg-moles/hr $Na_2CO_3$, and 7 kg/hr $H_2O$. A carbonaceous reducing agent (coke) is introduced into the reducer in an amount of 278 kg/hr to provide the stoichiometric requirements for reduction of all the sodium sulfite and sulfate to sulfide, and also provide a sufficient excess to maintain a desired temperature in the reducer. Air for reaction with the excess coke to maintain the desired temperature is introduced into the reducer in an amount of 45 kg-moles/hr. The reducer is maintained at a temperature of about 1000° C. and at ambient pressure. The results are set forth in the following tables, wherein the stream designations correspond to the numerical conduit designations set forth on the drawing.

TABLE 1

GAS STREAM COMPOSITIONS AND FLOW RATES

| Description | Stream Designation | Inert Gases (kg-moles/hr) | $CO_2$ | CO | $H_2S$ | $H_2O$ Vapor | Approx. Temp. °C. |
|---|---|---|---|---|---|---|---|
| Reducer Offgas | 63 | 35.6 | 18.67 | 2.25 | 0.059 | 3.52 | 1000 |
| Neutralizer Exhaust Gas | 44 | 10.0 | 0.22 | 0.63 | 0.006 | 0.47 | 30 |
| Neutralizer Feed Gas | 42 | 10.0 | 2.06 | 0.63 | 7.16 | 1.99 | 45 |
| Claus Feed Gas | 68 | 10.0 | 2.08 | 0.64 | 7.23 | 2.00 | 45 |
| Carbonator Offgas | 66 | 20.0 | 4.14 | 1.27 | 14.38 | 3.99 | 45 |
| Carbonator Feed Gas | 54 | 20.0 | 18.55 | 1.27 | 0.13 | 2.54 | 45 |
| Decomposer Offgas | 62 | — | 8.05 | — | 0.10 | 30.00 | 110 |
| Reducer Offgas Vent | 64 | 15.6 | 8.17 | 0.98 | 0.03 | 1.54 | 500 |
| Process Feed Gas | 65 | 20.0 | 10.50 | 1.27 | 0.03 | 1.98 | 500 |

TABLE 2

LIQUID STREAM COMPOSITIONS AND FLOW RATES

| Description | Stream Designation | $Na_2SO_4$ (kg-moles/hr) | $Na_2CO_3$ | $NaHCO_3$ | $Na_2S$ | NaHS | $H_2O$ (kg/hr) | Coke | Approx. Temp. °C. |
|---|---|---|---|---|---|---|---|---|---|
| Melt | 18 | 0.38 | 2.32 | — | 7.30 | — | — | ≈ 3 | 1000 |
| Process Water | 21 | — | — | — | — | — | 3900 | — | 20 |
| Green Liquor Slurry | 30 | 0.38 | 2.32 | — | 7.30 | — | 3900 | ≈ 3 | 30 |

TABLE 2-continued
LIQUID STREAM COMPOSITIONS AND FLOW RATES

| Description | Stream Designation | $Na_2SO_4$ (kg-moles/hr) | $Na_2CO_3$ | $NaHCO_3$ | $Na_2S$ | NaHS | $H_2O$ (kg/hr) | Coke | Approx. Temp. °C. |
|---|---|---|---|---|---|---|---|---|---|
| Unreacted Coke | 34 | — | — | — | — | — | 5 | ≈ 3 | 28 |
| Clarified Green Liquor | 36 | 0.38 | 2.32 | — | 7.30 | — | 3895 | — | 28 |
| Neutralized Liquor | 46 | 0.38 | 0.55 | 3.68 | — | 14.45 | 3889 | — | 57 |
| Cooled Neutralized Liquor | 50 | 0.38 | 0.55 | 3.68 | — | 14.45 | 3889 | — | 43 |
| Carbonated Liquor | 56 | 0.38 | 0.47 | 18.10 | — | 0.20 | 3605 | — | 63 |
| Condensate | 57 | — | — | — | — | — | 530 | — | 45 |
| Carbonate Product | 60 | 0.38 | 8.62 | 1.90 | — | 0.1 | 3300 | — | 65 |

From the foregoing data it is seen that the present invention provides a method wherein it is possible to obtain a product gas stream containing greater than 30% $H_2S$ (stream 68) utilizing a waste gaseous stream of $CO_2$, in which the $CO_2$ is present in an amount of from 15 to 35 vol.% (stream 65). When the $H_2S$ gas stream is passed to a conventional Claus plant, there is produced 231 kg/hr of substantially pure sulfur, thus demonstrating the utility of the present invention to produce an $H_2S$ gas stream greater than 30 vol.% $H_2S$ utilizing a dilute source of $CO_2$.

While certain exemplary reactions have been described with respect to the individual steps of the present method, it will be appreciated that the actual mechanism of each reaction is highly complex, and several competing reactions may occur simultaneously. Further, even where the desired reactions do not go to completion, and products are also produced by competing or undesired side reactions, the unreacted or undesired products may be recycled in or carried through the process without substantial interference with the basic method. Thus, while the example illustrating this invention has been described with respect to specific concentrations, time, temperature, pressure, and other specific reaction conditions, the invention may be otherwise practiced as will be readily apparent to those skilled in this art. Accordingly, this invention is not to be limited by the illustrative and specific embodiments thereof, but its scope should be determined in accordance with the following claims.

What is claimed is:

1. A method of treating an aqueous alkali metal sulfide-containing liquor to remove the sulfur values therefrom, said alkali metal being selected from the group consisting of sodium, potassium, rubidium and cesium, comprising the steps of:

(a) introducing said aqueous alkali metal sulfide-containing liquor, said liquor having a pH within the range of from about 12 to 14 and which contains a solute comprising at least about 60 mole % of said alkali metal sulfide, into a neutralization zone where it is intimately contacted and reacted at a temperature of from about 30° to 60° C. with a sufficient amount of an $H_2S$- and $CO_2$-containing gas obtained from step (d) to produce a product liquor of reduced alkalinity having a pH of from about 7.5 to 9.5 and comprising a slurry of alkali metal bisulfide and alkali metal bicarbonate, and an offgas substantially free of $H_2S$ and $CO_2$;

(b) withdrawing a stream of the product liquor from step (a), cooling it to a temperature of from about 30° to 45° C., and introducing the cooled liquor into a carbonation zone;

(c) contacting the liquor in said carbonation zone with a sufficient amount of a $CO_2$-containing gas obtained from step (f) to produce a liquid product stream comprising a slurry of at least about 90 mole % alkali metal bicarbonate and less than about 10 mole % alkali metal sulfide, and a product gas comprising at least 30 volume % $H_2S$ and from 8 to 20 volume % $CO_2$ on a dry basis;

(d) recovering the product gas from step (c) and introducing a part of it into step (a);

(e) recovering the liquid product stream from the carbonation zone in step (c) and thermally decomposing it at a temperature of from about 90° to 250° C. to produce a $CO_2$-rich offgas and a concentrated solution, which contains a solute comprising at least 51 mole % alkali metal carbonate and the balance of the solute being principally alkali metal bicarbonate; and (f) recovering the $CO_2$-rich offgas from step (e), mixing it with a dilute $CO_2$-containing gas and introducing the mixture into the carbonation zone in step (c).

2. The method of claim 1 wherein the alkali metal is sodium.

3. The method of claim 1 wherein in step (f) the dilute $CO_2$-containing gas is obtained from a reducer wherein a mixture of sulfite and sulfate of said alkali metal are reacted with a reducing agent at a temperature of from about 900° to 1100° C. to form molten alkali metal sulfide and an offgas comprising nitrogen and from about 15 to 35 volume % $CO_2$.

4. The method of claim 3 wherein the aqueous alkali metal sulfide-containing liquor of step (a) is produced by quenching said molten alkali metal sulfide in water.

5. The method of claim 4 wherein said alkali metal is sodium.

6. The method of claim 5 wherein in step (a) the product liquor of reduced alkalinity has a pH within the range of from 7.5 to 8.5.

* * * * *

UNITED STATES PATENT AND TRADEMARK OFFICE
CERTIFICATE OF CORRECTION

PATENT NO. : 4,153,670
DATED : May 8, 1979
INVENTOR(S) : Robert D. Rennick

It is certified that error appears in the above-identified patent and that said Letters Patent is hereby corrected as shown below:

On the title page under "References Cited"

"Hartman et al." should read -- Hultman et al. --.

"Vewemark" both occurrences, should read -- Venemark --.

"Markawt et al." should read -- Markant et al. --.

"Shiha" should read -- Saiha --.

"Kohl" should read -- Kohl et al. --.

Signed and Sealed this

Twelfth Day of June 1984

[SEAL]

Attest:

Attesting Officer

GERALD J. MOSSINGHOFF

Commissioner of Patents and Trademarks